Z. LITTMAN.
VALVE.
APPLICATION FILED MAY 24, 1919.
1,401,619. Patented Dec. 27, 1921.
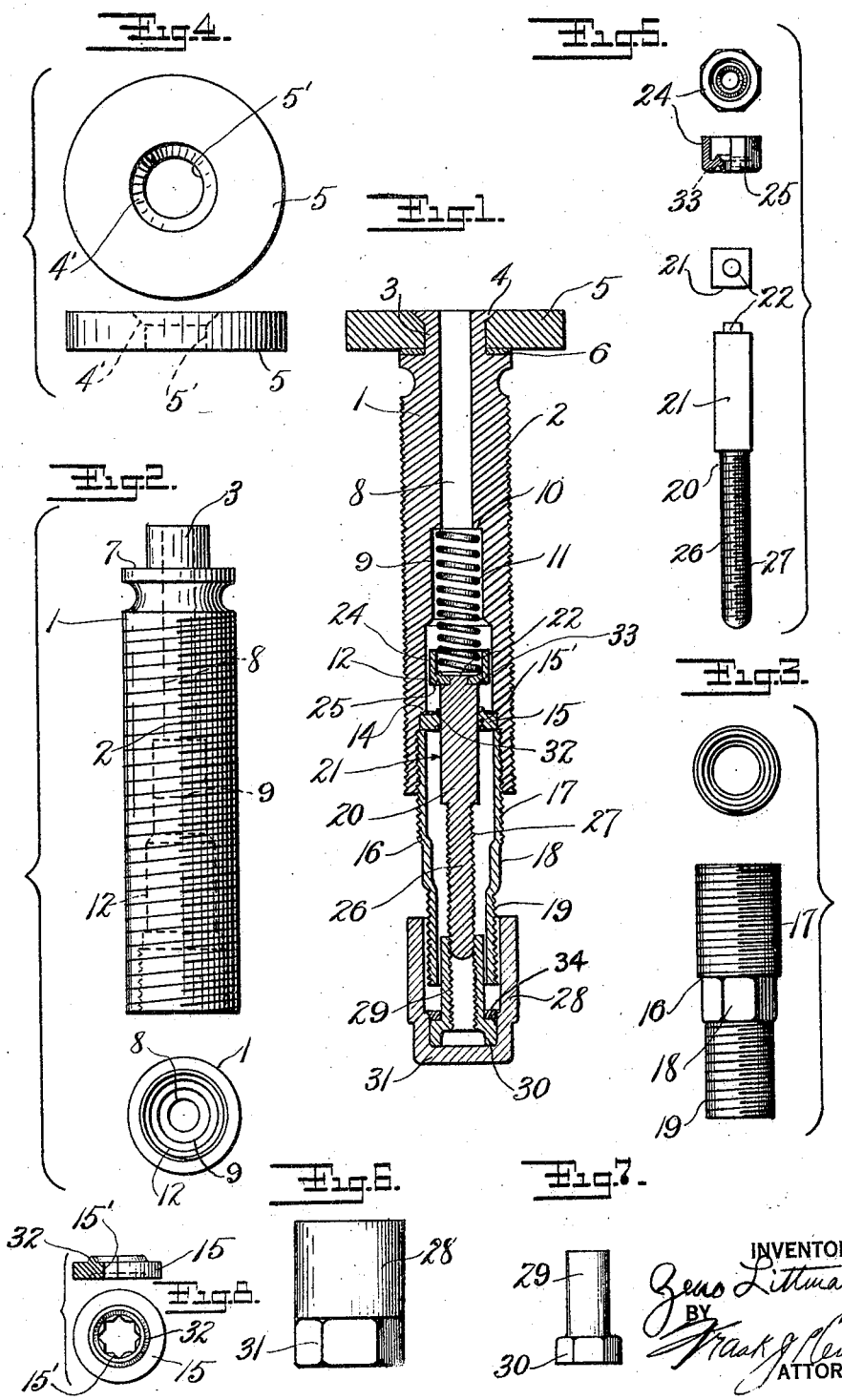

UNITED STATES PATENT OFFICE.

ZENO LITTMAN, OF NEW YORK, N. Y., ASSIGNOR TO LITTMAN LOXAIR VALVE CORPORATION, A CORPORATION OF DELAWARE.

VALVE.

1,401,619.  Specification of Letters Patent.  Patented Dec. 27, 1921.

Application filed May 24, 1919. Serial No. 299,626.

*To all whom it may concern:*

Be it known that I, ZENO LITTMAN, a citizen of the United States, residing at New York, in the county of New York and State of New York, have invented certain new and useful Improvements in Valves, of which the following is a specification.

This invention relates to valves, particularly such as are used with pneumatic tires and among the objects of the invention are, to provide a construction including a minimum number of parts and of great simplicity so that the cost of manufacture and assembly is low; and to provide a construction in which the valve is manually as well as automatically brought to position and the escape of air from the tire entirely prevented, so far as the valve is concerned.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification, and in which I have shown merely a preferred form of embodiment of invention, Figure 1 is a central vertical sectional view of a tire valve embodying the invention; Fig. 2 is a collective view showing in elevation and in plan the main tubular shell in and by which the other parts of the device are supported; Fig. 3 is a collective view showing in plan and in side elevation one of the component parts of the device; Fig. 4 is a similar view of the washer or part which is located inside the tire tube, and to which the valve structure is connected; Fig. 5 is a collective view showing in plan and in elevation the valve stem and the valve proper carried thereby; Fig. 6 is an elevation of the closure cap; Fig. 7 is a similar view of the nipple which is contained within and forms a part of the closure cap; Fig. 8 is a collective detail in plan and section of the sealing washer with which the valve proper coöperates.

Referring to the numerals on the drawing, there is shown at 1 a tubular shell in and by which the other parts of the device are supported. The shell is threaded exteriorly at 2, as usual, and at its inner end is provided with a reduced portion 3 which is intended to be upset as indicated at 4, after the reduced portion 3 has been inserted within a washer 5, said washer being provided with a bore 5' and a flared part 4' to permit of the insertion and upsetting of the reduced end 3. This washer 5 is to be positioned inside the tire tube, and to absolutely prevent leakage of air between the washer 5 and the tube 1 a gasket 6 may be inserted between the shoulder 7 at the base of the reduced portion 3, and the adjacent face of the washer 5. The bore through the shell 1 by which air passes into the interior of the tire tube, is indicated at 8 and toward the outer end of the tube this bore is enlarged as indicated at 9 to form a shoulder 10 on which is to be seated one end of a coiled spring 11. Outwardly of the enlargement 9 there is a further enlargement of the bore, indicated at 12 and at the outer end of this enlargement there is a further enlargement defined by a shoulder 14. A sealing washer 15 having, for instance, a sixteen-sided central opening 15', rests upon the shoulder 14, and is held in the Fig. 1 position by means of a thimble 16 exteriorly threaded at 17 for engagement with corresponding threads internally of the outer end of the main tube 1. This thimble 16 is provided with an octagonal or otherwise shaped portion 18 for engagement with a wrench or other tool so that the thimble may be screwed down into the tube 1 or removed therefrom as desired; and outwardly of said wrench-engaging portion 18 the thimble 16 is provided with external threads 19 for engagement with the threads of a pump attachment or the like. 20 indicates a valve stem having, for instance, a squared portion 21 which passes through the central opening 15' in the sealing washer, but leaves alternate angular portions of the said opening unobstructed, the purpose of this arrangement being that when the sealing washer is fixed in the Fig. 1 position the valve stem 20 cannot be rotated, though it is free to travel longitudinally through the sealing washer 15; and of course air is free to pass through the unobstructed angular portions of the opening 15' until the same are covered, as hereinafter described. At its inner end this valve stem 21 is provided with a reduced portion 22, which is intended to enter the bottom of a cup-shaped valve member, the stem and the cup being secured together by upsetting the portion 22 after the parts are connected. Or, the cup and stem may be integral if desired. The opening of the cup extends inwardly of the tube 1 and receives the outer end of the spring 11, so that the expansion of this spring will tend to move the valve stem outwardly or downwardly with respect to Fig. 1. The cup-shaped valve member 24 reciprocates within the enlargement 12 of the bore 8, and the outside bottom surface of the cup is provided with a circular groove or depression 33, while the opposed face of the sealing washer 15 is provided with an annular projection 32. The face of the sealing washer 15 which makes contact with the lower face 25 of the valve member 24 and shoulder 14 is also preferably provided with a packing as indicated, and when the valve member 24 and the sealing washer 15 are brought into contact the packing is jammed into the groove 33 to make a tight seal, the entire central opening 15' being thus closed. The pressure of air within the tire tube is ordinarily sufficient to force the valve member 24 into the sealing position with relation to the washer 15, with the aid of the spring 11, but I prefer to supplement this automatic action by providing manual means for further and forcibly drawing the valve stem 20 downwardly with respect to Fig. 1 to the desired extent. Accordingly, the outer end 26 of the valve stem 20 is threaded, as indicated at 27, and a closure cap 28 is provided which carries an internally threaded nipple 29, having an enlarged head 30, preferably hexagonal, which is forced into the correspondingly shaped head 31 of the closure cap 28. It will be apparent that upon engagement of the threads 27 with the nipple 29 the valve stem 20 will be drawn downwardly with respect to Fig. 1 to insure the sealing relation between the valve member 24 and the sealing disk 15. Of course, the spring 11 may be dispensed with, if desired.

In assembling, the lower end (Fig. 1) of the spring 11 may be fastened within the cup 24, and the valve stem 20, with the sealing washer 15 in position thereon, and carrying the valve member 24 and spring 11, may be inserted into the tube 1, after which the nipple 16 is screwed into the outer end of the tube 1 until the sealing washer 15 is jammed and tightly held against the shoulder 14. The introduction of air under pressure into the outer end of the nipple 16 forces the valve member 24 away from the sealing washer 15, but movement of air in the other direction from the tire tube to the outside is prevented, because the pressure within the tire tube, acting against the open cup, will tend to seat the valve member 24 against the washer 15, and the spring 11 will have the same effect. In order to make this seal more positive, however, the closure cap 28 is put in position as shown in Fig. 1 and turned down until the engagement of the nipple 29 with the threads 27 draws the valve stem more forcibly downward to the sealing position. Before the parts have reached this ultimate position the outer end of nipple 16 will have come in contact with a gasket 34 positioned in the cap 28 around tube 29, to make a further seal against possible slow leaks, and against the entrance of dust or water into the valve tube. Of course, when the valve member 24 and sealing washer 15 are in sealing position, the central opening 15' of the washer is completely closed.

It will be evident that the metal parts are all such as may be cheaply made, and there are no difficulties in assembly.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:—

1. A device of the kind described comprising a tubular shell provided internally with a shoulder defining an enlargement of the bore of the shell, a sealing washer seated in the shell against the shoulder and having a central opening therethrough, a valve stem passing through the washer aperture and non-rotative with respect thereto, the stem being out of contact with the edges of the aperture, at certain points, a valve member carried by the stem at one side of the washer and adapted upon movement of the stem to make sealing contact with the washer and to extend beyond the edges of the washer aperture, means for holding the washer in fixed position against the shoulder within the shell, and means engaging the valve stem to move the same and draw the valve member into sealing engagement with the washer.

2. A device as set forth in claim 1, in which the means for holding the washer in fixed position within the shell is a thimble having threaded engagement with the interior of the shell.

3. A device of the kind described comprising a tubular shell, provided internally with a shoulder defining an enlargement of the bore of the shell, a sealing washer seated in the shell against the shoulder and having a central opening therethrough, a valve stem passing through the washer aperture and non-rotative with respect thereto, the stem being out of contact with the edges of the aperture at certain points, a cup shaped valve member carried by the stem at one side of the washer and adapted upon movement of the stem in one direction to make sealing contact at the outside thereof with the washer and to extend beyond the edges of the washer aperture, means for holding the washer in fixed position against the shoulder within the shell, and spring means engaging inside the cupped valve member to move the valve stem and valve to sealing position.

In testimony whereof I affix my signature.

ZENO LITTMAN.